(12) United States Patent
Wang

(10) Patent No.: US 7,434,971 B1
(45) Date of Patent: Oct. 14, 2008

(54) FLAGPOLE LAMP OF A VEHICLE HEAD

(76) Inventor: Ming-Cheng Wang, P.O. Box 90, Tainan City 70499 (TW)

( * ) Notice: Subject to any disclaimer, the term of this patent is extended or adjusted under 35 U.S.C. 154(b) by 0 days.

(21) Appl. No.: 12/014,116

(22) Filed: Jan. 15, 2008

(51) Int. Cl.
*B60Q 11/00* (2006.01)

(52) U.S. Cl. .................... 362/496; 362/249; 362/431

(58) Field of Classification Search ................ 362/493, 362/496, 505, 506, 545, 184, 249, 431, 806; 40/591, 592; 116/28 R
See application file for complete search history.

(56) References Cited

U.S. PATENT DOCUMENTS 4,598,339 A * 7/1986 Ainsworth .................. 362/540

2005/0169011 A1* 8/2005 Tsai ........................... 362/565
2007/0089338 A1* 4/2007 Barnhouse et al. ............ 40/604

* cited by examiner

*Primary Examiner*—Thomas M Sember

(57) ABSTRACT

A flagpole lamp of a vehicle head includes a pole, a lower connecting member, a lower bar, a lucent bar, an upper circuit board, a lower circuit board, an upper bar, a positioning base, an upper connecting member and a pole head. The components are correspondingly assembled together. The lucent bar and the pole head are formed as light-transmitting objects. The upper circuit board, the lower circuit board and the positioning base are each provided with at least one luminous body. With the lights lighted up to keep the lucent bar and the pole head colorfully brightened, a driver can clearly see the corners and the position of an vehicle head while turning on headlights, and apparently drivers of other cars running beside and behind the vehicle can be warned so as to advance traffic security.

7 Claims, 5 Drawing Sheets

FLAGPOLE LAMP OF A VEHICLE HEAD

BACKGROUND OF THE INVENTION

1. Field of the Invention

This invention relates to a flagpole lamp of a vehicle head, particularly to one having a lucent bar and a pole head able to be brightened with a colored light at the same time to let a driver clearly see the corners and the position of a vehicle head while turning on headlights, and able to flashily emit another colored light to apparently tell other drivers the intension of the driver while turning on directional lights, so as to enhance traffic security.

2. Description of the Prior Art

Commonly, two sides of a vehicle's head are respectively installed with a conventional flagpole used for a driver to clearly see the corners and the position of a car's head to avoid accidental collisions. However, the conventional flagpole is usually made of metal, just used to indicate the width of the head and unable to be clearly seen in the night. Therefore, the conventional flagpole can not effectively play the role.

SUMMARY OF THE INVENTION

The objective of this invention is to offer a flagpole lamp of a vehicle head that can let a driver clearly see the corners and the position of a vehicle head by emitting a colored light at the same time while turning on headlights, and that can flashily emit another colored light to apparently tell drivers of other cars running beside and behind the car the intension of the driver while turning on directional lights, so as to enhance traffic security.

The main characteristic of the invention includes a pole, a lower connecting member, a lower bar, a lucent bar, an upper circuit board, a lower circuit board, an upper bar, a positioning base, an upper connecting member and a pole head. The lower connecting member fixed on the pole is provided with a chamber inside it. The chamber is provided with a through hole formed therein and a conducting plate installed therein. The lower bar is fixed on the lower connecting member. The lucent bar formed as a light-transmitting object is fixed on the lower bar and provided with a through hole formed therein, two chambers respectively formed in an upper portion and a lower portion thereof and a central tube fitted in the through hole thereof. The upper circuit board and the lower circuit board are respectively installed in the chambers of the upper and lower portions of the lucent bar. The upper circuit board and the lower circuit board are each provided with at least one luminous body. A power line is connected between the upper circuit board and the lower circuit board. The lower circuit board is provided with a conducting spring and a conducting connector fixed at its bottom. The upper bar fixed on a top of the lucent bar is provided with a chamber formed inside it and a through hole formed under the chamber. The positioning base installed in the chamber of the upper bar is provided with at least one luminous body and a power line fixed at its bottom to connect with the upper circuit board. The upper connecting member fixed on the upper bar is provided with a projection formed at its top and a through hole bored centrally in the projection. The pole head formed as a light-transmitting object for being mounted on the upper connecting member is provided with a recess formed therein.

BRIEF DESCRIPTION OF DRAWINGS

This invention is better understood by referring to the accompanying drawings, wherein.

DETAILED DESCRIPTION OF THE PREFERRED EMBODIMENT

Figure 1:
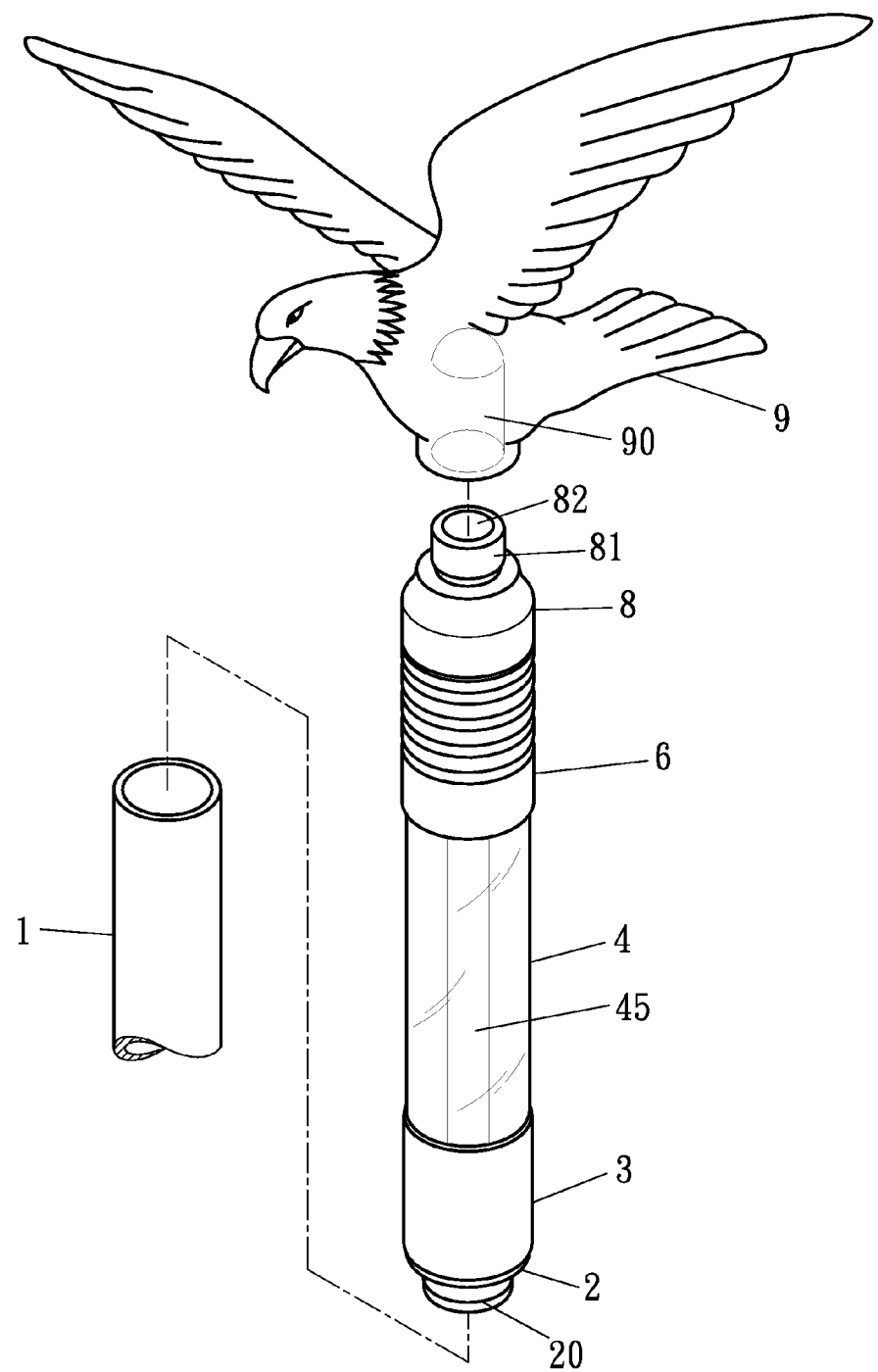
FIG. 1 is an exploded perspective view of a preferred embodiment of a flagpole lamp of a vehicle head in the present invention.
Figure 2:
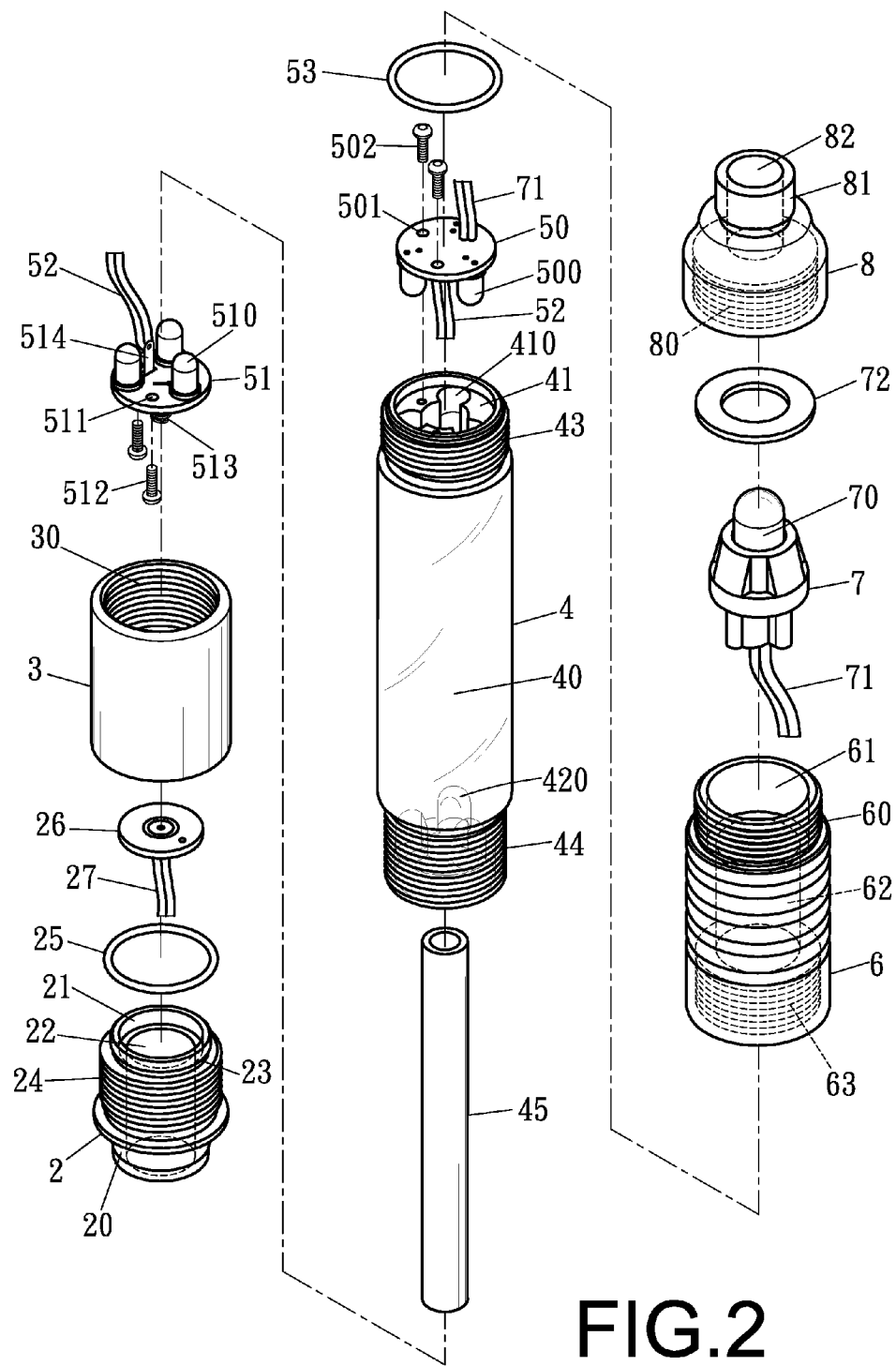
FIG. 2 is an exploded perspective view of a lucent bar of the preferred embodiment of a flagpole lamp of a vehicle head in the present invention.
Figure 3:
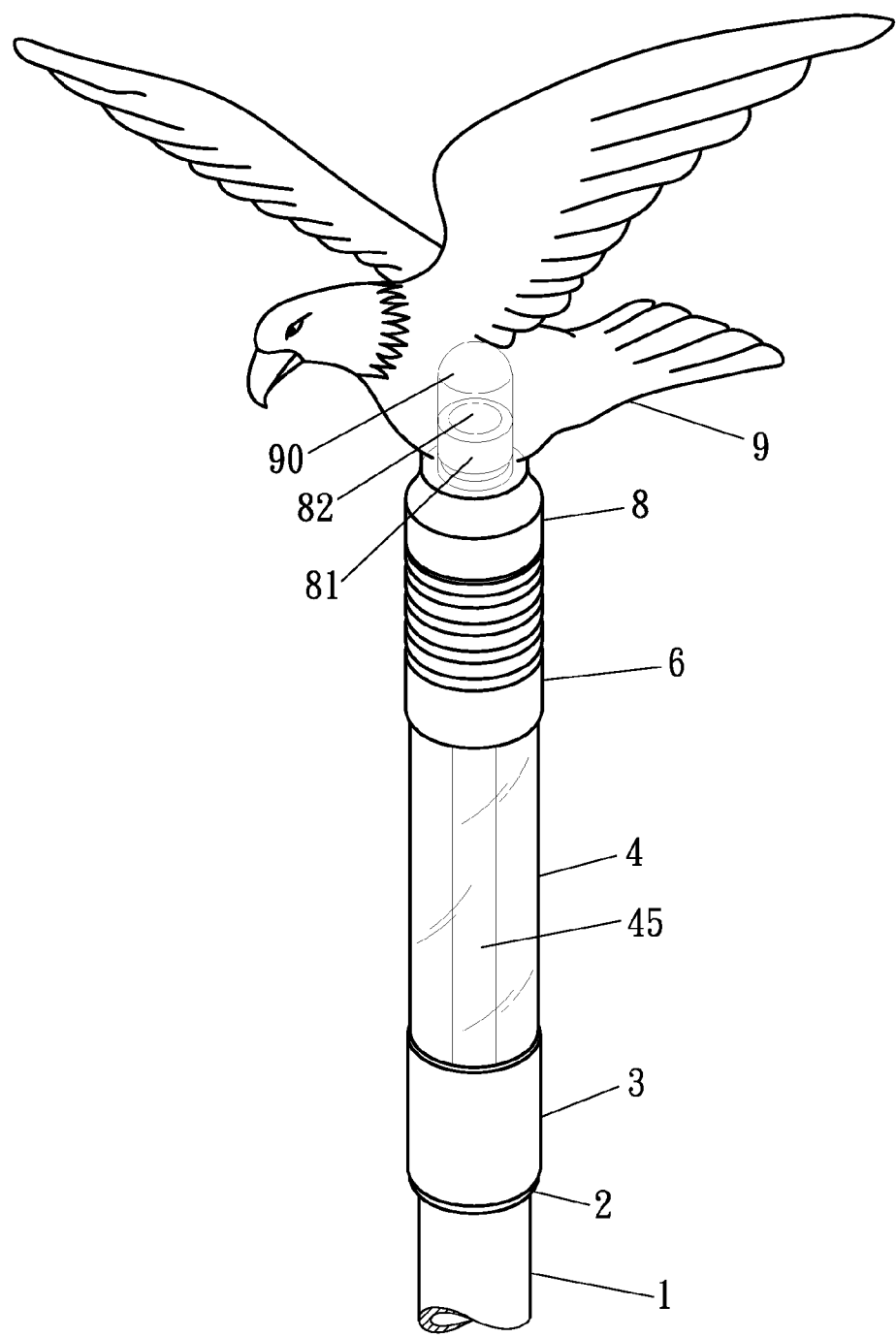
FIG. 3 is a perspective view of the preferred embodiment of a flagpole lamp of a vehicle head in the present invention.
Figure 4:
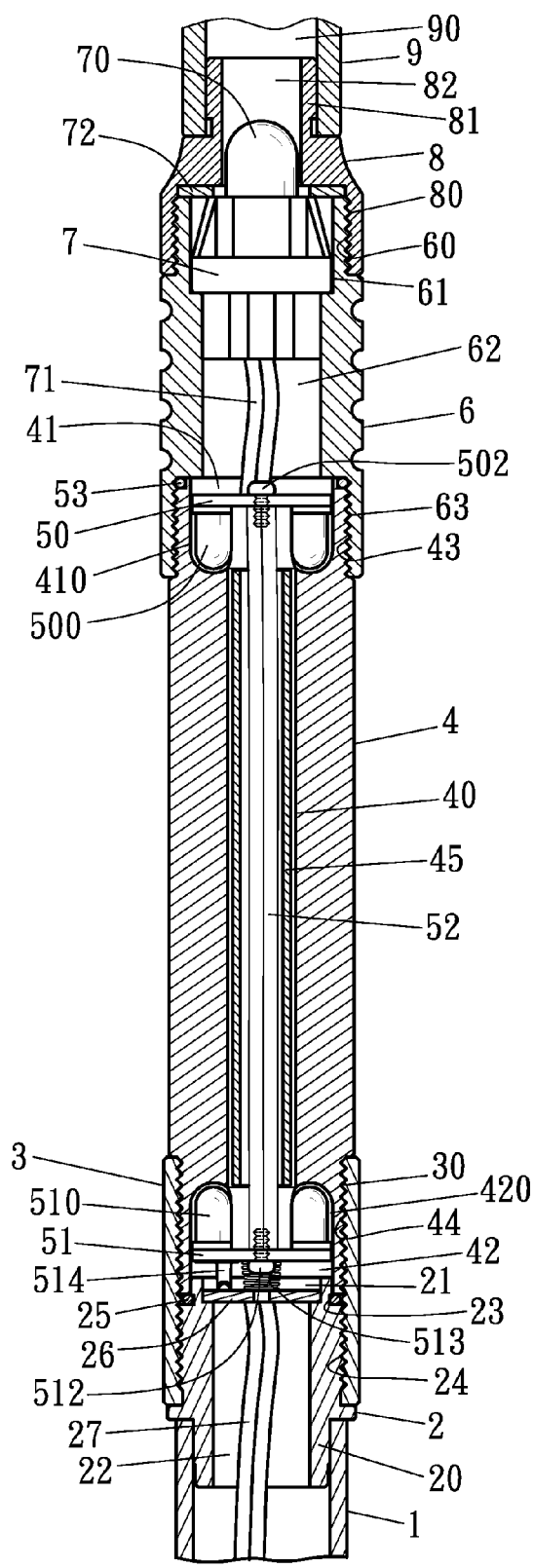
FIG. 4 is a cross-sectional view of the preferred embodiment of a flagpole lamp of a vehicle head in the present invention; and, FIG. 5 is a schematic view of the preferred embodiment of a flagpole lamp of a vehicle head in the present invention, showing it installed on a vehicle head and being lighted up while turning on headlights.

As shown in FIGS. 1~4, a preferred embodiment of a flagpole lamp of a vehicle in the present invention consists of a pole 1, a lower connecting member 2, a lower bar 3, a lucent bar 4, an upper circuit board 50, a lower circuit board 51, an upper bar 6, a positioning base 7, an upper connecting member 8 and a pole head 9.

The pole 1 is formed tubular.

The lower connecting member 2 fixed on the pole 1 is provided with a projection 20 formed at its lower portion, a chamber 21 formed inside it, a through hole 22 formed inside the chamber 21, a groove 23 formed near its top, male threads 24 formed around its outer wall, a waterproof ring 25 fitted in the groove 23, a conducting plate 26 installed in the chamber 21, and a power line 27 connected under the conducting plate 26.

The lower bar 3 formed as a tube is fixed on the lower connecting member 2, and provided with female threads 30 formed around its inner wall.

The lucent bar 4 formed as a light-transmitting object to be fixed on the lower bar 3 is provided with a through hole 40 formed inside it, two chambers 41 and 42 respectively formed inside its upper and lower portions, two recesses 410 and 420 respectively formed in the chambers 41 and 42, male threads 43 and 44 respectively formed around outer walls of its upper and lower portions, and a central tube 45 fitted in the through hole 40 with its surface electroplated so as to reflect.

The upper circuit board 50 and the lower circuit board 51 are respectively installed in the chambers 41 and 42 of the upper and lower portions of the lucent bar 4. The upper circuit board 50 is provided with at least one luminous body 500 such as a light emitting diode (LED) able to alter its light color and at least one through hole 501 each for a screw 502 to fix therein. The lower circuit board 51 is provided with at least one luminous body 510 such as a light emitting diode (LED) able to alter its light color and at least one through hole 511 each for a screw 512 to fix therein. The lower circuit board 51 is provided with a conducting spring 513 and a conducting connector 514 fixed at its bottom. The conducting connector 514 is extended up to position over the top of the lower circuit board 51. A power line 52 is connected between the upper circuit board 50 and the lower circuit board 51. And a waterproof ring 53 is fitted around an upper end of the lucent bar 4.

The upper bar 6 fixed on the lucent bar 4 is provided with male threads 60 formed around an outer wall of an upper portion thereof, a chamber 61 formed therein, a through hole 62 formed under the chamber 61, and female threads 63 formed around an inner wall of a lower portion thereof.

The positioning base 7 installed in the chamber 61 of the upper bar 6 is provided with at least one luminous body 70, a power line 71 fixed at its bottom to connect with the upper circuit board 50, and a waterproof washer 72 positioned on a top of the upper bar 6.

The upper connecting member 8 fixed on the upper bar 6 is provided with female threads 80 formed around an inner wall of a lower portion thereof, a projection 81 formed at a top thereof, and a through hole 82 bored in the projection 81.

The pole head 9 formed as a light-transmitting object with a design such as an eagle is mounted on the upper connecting member 8 and provided with a recess 90 formed inside it.

In assembly, as shown in FIGS. 1~4, firstly fit the waterproof ring 53 around an upper end of the lucent bar 4, and then insert the central tube 45 into the through hole 40 of the lucent bar 4. Secondly, fix the upper circuit board 50 and the lower circuit board 51 respectively in the chambers 41 and 42 of the upper and lower portions of the lucent bar 4 by the screws 502 and 512, with the luminous bodies 500 and 510 of the upper circuit board 50 and of the lower circuit board 51 respectively fitted in the recesses 410 and 420 of the chambers 41 and 42, and with the power line 52 connected between the upper circuit board 50 and the lower circuit board 51. Thirdly, engage the lower bar 3 with the lower portion of the lucent bar 4, Fourthly, fit the waterproof ring 25 in the groove 23 of the lower connecting member 2, place the conducting plate 26 in the chamber 21 of the lower connecting member 2, and engage the lower connecting member 2 with the lower portion of the lower bar 3, with the conducting spring 513 and the conducting connector 514 of the lower circuit board 51 contacting with the conducting plate 26, and with the bottom of the lucent bar 4 pressing on the waterproof ring 25. Fifthly, insert the positioning base 7 into the chamber 61 of the upper bar 6, and then engage the upper bar 6 with the upper portion of the lucent bar 4, with the power line 71 passing through the through hole 62 of the upper bar 6 to be connected with the upper circuit board 50. Sixthly, place the waterproof washer 72 on the top of the upper bar 6, and then engage the upper connecting member 8 with the top of the upper bar 6, with the at least one luminous body 70 of the positioning base 7 fitted in the through hole 82 of the upper connecting member 8. Seventhly, mount the pole head 9 on the upper member 8, with the projection 81 of the upper connecting member 8 fixedly inserted in the recess 90 of the pole head 9. Finally, insert the projection 20 of the lower connecting member 2 into the pole 1 to finish the whole assembly of the invention.

Figure 5:
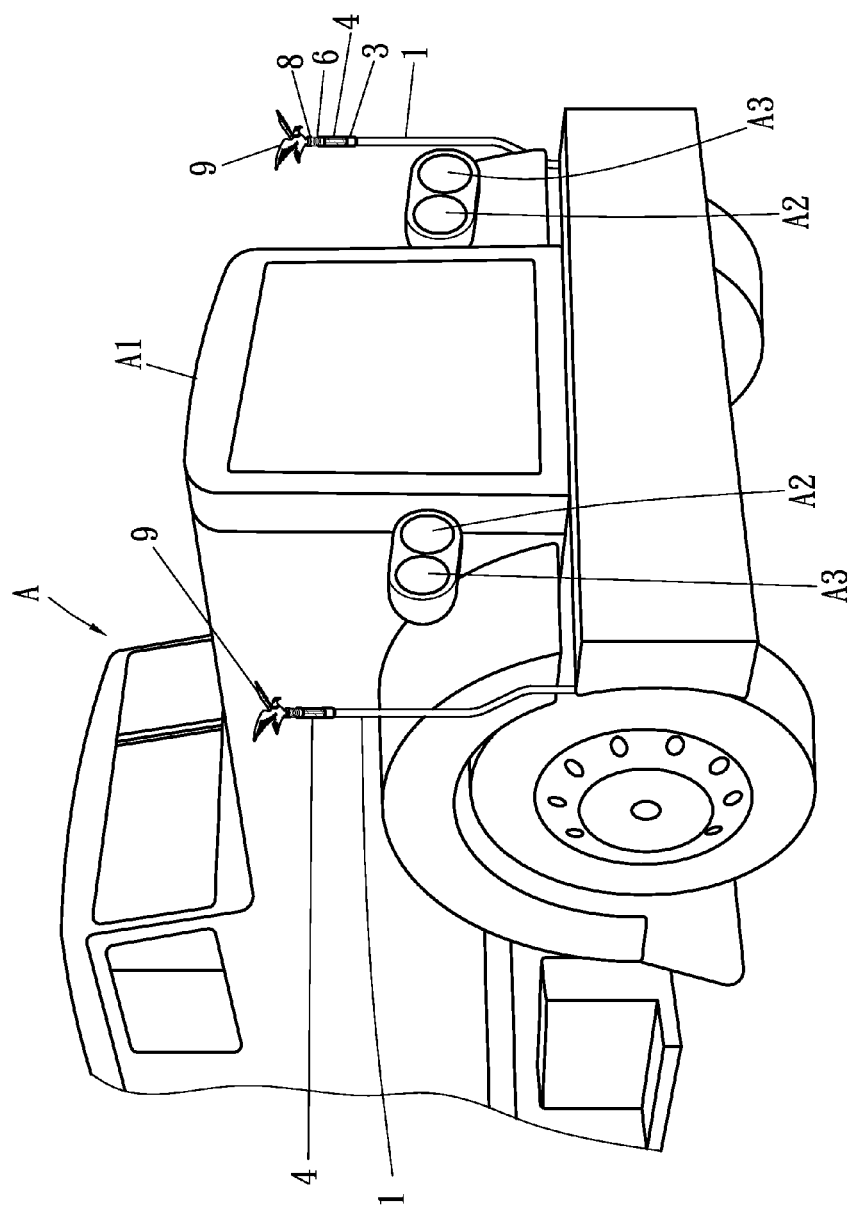

In using, as shown in FIG. 5, the pole 1 is positioned respectively at two corners of a vehicle head (A1) of a vehicle (A), with the power line 27 of the lower connecting member 2 connected to a lamp control circuit of the vehicle (A). When a driver turns on headlights (A2) (main ones or small ones) of the vehicle (A) in the night or in the dark, the luminous bodies 500, 510 and 70 of the upper circuit board 50, of the lower circuit board 51, and of the positioning base 7 can all be simultaneously actuated to emit colored lights (such as blue one). By the time, the luminous bodies 500 and 510 of the upper circuit board 50 and of the lower circuit board 51 emit a colored light toward the lucent bar 4 to be reflected by the electroplated surface of the central tube 45, keeping the lucent bar 4 fully shined; the at least one luminous body 70 of the positioning base 7 emits a colored light upwards capable of transmitting out of the pole head 9 to keep the pole head 9 as well shined. So, the driver can clearly see the corners and the position of the vehicle head (A1) to prevent any collisions from happening. Also, the pole head 9 has an aesthetic figure. Moreover, when a driver intends to make a turn with the directional lights (A3) turned on, the luminous bodies 500, 510 and 70 of the upper circuit board 50, of the lower circuit board 51 and of the positioning base 7 can be as well automatically actuated to flashily emit another colored light (such as orange one) capable of respectively transmitting out of the lucent bar 4 and the pole head 9 to attract attention of drivers of other cars running beside and behind the vehicle (A) for enhancing traffic security.

While the preferred embodiment of the invention has been described above, it will be recognized and understood that various modifications may be made therein and the appended claims are intended to cover all such modifications that may fall within the spirit and scope of the invention.

What is claimed is:

1. A flagpole lamp of a vehicle head comprising:
    a pole;
    a lower connecting member fixed on said pole and provided with a chamber formed inside it, said chamber provided with a through hole formed therein and a conducting plate installed therein;
    a lower bar fixed on said lower connecting member;
    a lucent bar formed as a light-transmitting object to be fixed on said lower bar and provided with a through hole formed therein two chambers respectively formed in an upper portion and a lower portion thereof, and a central tube fitted in said through hole thereof;
    an upper circuit board and a lower circuit board respectively installed in said chambers of said upper and lower portions of said lucent bar, said upper circuit board and said lower circuit board each provided with at least one luminous body, a power line connected between said upper circuit board and said lower circuit board, said lower circuit board provided with a conducting spring and a conducting connector fixed at a bottom thereof;
    an upper bar fixed on said lucent bar and provided with a chamber formed inside it and a through hole formed under said chamber;
    a positioning base installed in said chamber of said upper bar and provided with at least one luminous body and a power line fixed at its bottom to connect with said upper circuit board;
    an upper connecting member fixed on said upper bar and provided with a projection formed at its top and a through hole formed in said projection; and,
    a pole head formed as a light-transmitting object for being mounted on said upper connecting member and provided with a recess formed therein.

2. The flagpole lamp of a vehicle head as claimed in claim 1, wherein said pole is formed tubular, and said lower connecting member is provided with a projection formed at its lower portion for being plugged in said pole.

3. The flagpole lamp of a vehicle head as claimed in claim 1, wherein male threads are respectively formed around outer walls of said lower connecting member, of said upper and lower portions of said lucent bar, and of an upper portion of said upper bar; female threads are respectively formed around inner walls of said lower bar, of a lower portion of said upper bar, and of a lower portion of said upper connecting member.

4. The flagpole lamp of a vehicle head as claimed in claim 1, wherein said upper circuit board and said lower circuit board are respectively fastened in said chambers of said upper and lower portions of said lucent bar by at least one screw.

5. The flagpole lamp of a vehicle head as claimed in claim 1, wherein said lower connecting member and said lucent bar are each fitted around with a waterproof ring; said upper bar is positioned with a waterproof washer on a top thereof.

6. The flagpole lamp of a vehicle head as claimed in claim 1, wherein said chamber of said upper portion of said lucent bar is provided with at least one recess for accommodating said at least one luminous body of said upper circuit board; said chamber of said lower portion of said lucent bar is provided with at least one recess for accommodating said at least one luminous body of said lower circuit board.

7. The flagpole lamp of a vehicle head as claimed in claim 1, wherein said central tube of said lucent bar has its surface electroplated so as to reflect.

* * * * *